(12) United States Patent
Roberts et al.

(10) Patent No.: US 9,491,633 B2
(45) Date of Patent: Nov. 8, 2016

(54) SYSTEM AND METHOD FOR POLICY-BASED SPECTRUM MANAGEMENT

(71) Applicant: Spectrum Bridge, Inc., Lake Mary, FL (US)

(72) Inventors: Robin U Roberts, Orlando, FL (US); Don Joslyn, DeBary, FL (US); Jeffery C Schmidt, Orlando, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 0 days.

(21) Appl. No.: 14/490,102

(22) Filed: Sep. 18, 2014

(65) Prior Publication Data
US 2015/0087347 A1    Mar. 26, 2015

Related U.S. Application Data

(60) Provisional application No. 61/882,294, filed on Sep. 25, 2013.

(51) Int. Cl.
*H04B 7/00*    (2006.01)
*H04W 16/14*    (2009.01)

(52) U.S. Cl.
CPC ................................. *H04W 16/14* (2013.01)

(58) Field of Classification Search
CPC ............................. H04W 16/14; H04W 48/02
USPC ....................................................... 455/509
See application file for complete search history.

(56) References Cited

U.S. PATENT DOCUMENTS

| | | |
|---|---|---|
| 2010/0105332 A1 | 4/2010 | McHenry |
| 2010/0202387 A1* | 8/2010 | Sawai .................. H04W 16/14 370/329 |
| 2011/0250915 A1* | 10/2011 | Stanforth ............. H04W 16/14 455/509 |
| 2012/0142382 A1 | 6/2012 | Stanforth |
| 2012/0258753 A1 | 10/2012 | Stanforth |

OTHER PUBLICATIONS

International Search Report and Written Opinion from corresponding PCT Application No. PCT/US2014/056742, dated Mar. 31, 2015.

* cited by examiner

*Primary Examiner* — Wesley Kim
*Assistant Examiner* — Raj Chakraborty
(74) *Attorney, Agent, or Firm* — Tucker Ellis LLP

(57) ABSTRACT

Managing spectrum use in a managed area where spectrum use is carried out by an incumbent user on an intermittent basis includes sensing spectrum use in the managed area and determining that the incumbent spectrum user is actively using spectrum in the managed area by analyzing sensor data. A spectrum use policy associated with characteristics of the determined spectrum use is made and one or more secondary spectrum users are notified that spectrum defined in the identified policy is unavailable for use by the one or more secondary users.

22 Claims, 4 Drawing Sheets

SYSTEM AND METHOD FOR POLICY-BASED SPECTRUM MANAGEMENT

RELATED APPLICATION DATA

This application claims the benefit of U.S. Provisional Patent Application No. 61/882,294, filed Sep. 25, 2013, the disclosure of which is herein incorporated by reference in its entirety.

TECHNICAL FIELD OF THE INVENTION

The technology of the present disclosure relates generally to wireless communications and, more particularly, to a system and method for managing the allocation and use of spectrum for wireless communications according to predetermined policies.

BACKGROUND

Spectrum allocation and/or management in a shared spectrum environment is sometimes controlled by a central management/allocation engine as part of a "top down" spectrum allocation approach. The engine identifies channels that are not occupied by an incumbent radio in the location of a device requesting spectrum and deems those channels available for use by the requesting device. Exemplary channels that may be allocated in this manner are TV white spaces. The knowledge of the incumbent radio devices is obtained from a database that contains information regarding incumbent users and a protected area for each incumbent user. The protected area for each incumbent may be determined by regulation or by calculation using the location of the incumbent device's transmitter and transmission characteristics (e.g., antenna height, transmit power, etc.). This type of spectrum management relies on prior (a priori) knowledge of information relating to the incumbent users.

Another approach to gaining access to spectrum in a shared environment involves use of spectrum sensing in a "bottom up" spectrum allocation approach. In this approach, a cognitive radio senses its surrounding spectrum environment and avoids channels on which the cognitive radio senses the presence of an incumbent user.

Each of these approaches has limitations in its effectiveness in certain situations. For example, there are some incumbent radios that may move or may not always be active. Therefore, there are times when a secondary user may be able to use the spectrum ordinarily used by the incumbent radio. But a top-down approach is difficult to apply due to the unpredictable spectrum use made by the incumbent user. Also, applying policies regarding spectrum use in a bottom up approach is not practical.

DETAILED DESCRIPTION OF EMBODIMENTS

Figure 1:
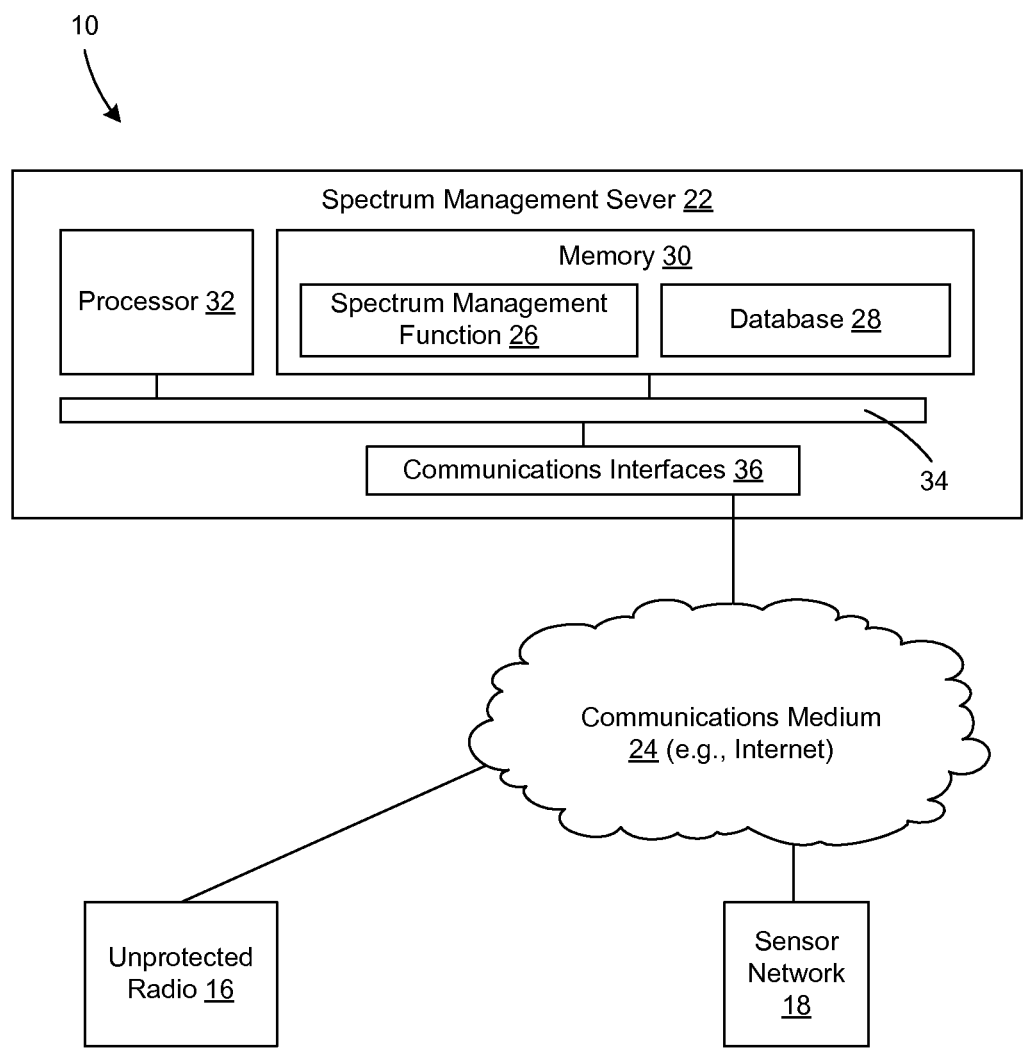
FIG. 1 is a schematic view of an exemplary system for managing spectrum in a policy-driven manner.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. INTRODUCTION

The approach described in this disclosure involves aspects of both a top down approach and a bottom up approach to spectrum management. This yields a solution that combines aspects of both approaches to improve spectrum allocation in a shared spectrum use environment. The disclosed approach may have application in a number of contexts. One context in which the disclosed approach is particularly effective is for facilitating shared spectrum use in environments where the physical presence and/or spectrum use of one or more incumbent users is unpredictable.

Described are systems and methods for policy-based spectrum management. The spectrum management approach regulates spectrum that is available to radio devices for wireless applications such as, but not limited to, data communications. The spectrum management techniques involve collecting and analyzing radio frequency (RF) sensing data and applying spectrum use policies. The policies may be put into effect with a server that implements a policy-based spectrum management/allocation engine (sometimes referred to as a geo-location spectrum database).

The techniques employ a combination of a policy-based spectrum management and spectrum sensing (e.g., with RF sensors or cognitive radios) to protect incumbent operations. The approach allows for the radio operations of the incumbent devices (e.g., transceivers) to be protected in the location of the incumbent devices.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with unavailable channels. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

In embodiments in this disclosure, the server may undertake spectrum management functions other than those that are described in detail, such as responding to white space channel list requests with appropriate channel lists. Therefore, in some embodiments, the server may be considered a central spectrum or white space registration/allocation system.

B. SYSTEM ARCHITECTURE

Figure 2:
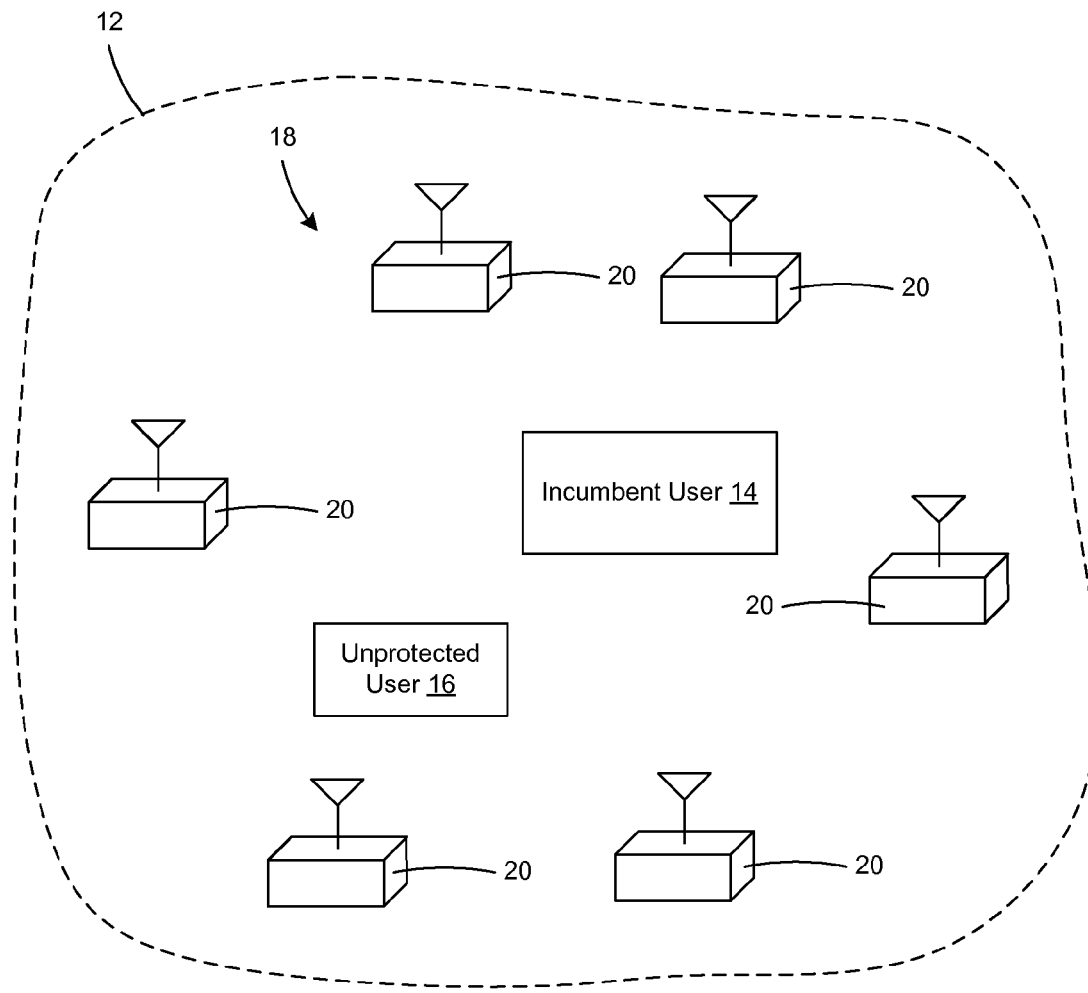
FIG. 2 is a schematic view of a managed area in which spectrum use is managed by the system.

With initial reference to FIGS. 1 and 2, schematically illustrated are a spectrum management system 10 and an exemplary managed area 12. The managed area 12 serves as a representative operational context for the system 10. Aspects of the spectrum management system 10 will be described in the context of sharing spectrum to which a priority user (also referred to as an incumbent user 14, which takes the form of a radio or spectrum-using device) has dominating use rights over unprotected users (also referred to as secondary users 16, which take the form of radios or spectrum-using devices). The rights of the incumbent user 14 may be exclusive rights. Therefore, in the presence of the incumbent user 14, any other users or potential users of the spectrum will not be permitted to use the spectrum occupied by the incumbent user 14.

The spectrum (e.g, frequencies or channels) for which the incumbent user 14 has dominating rights over the secondary users 16 will be referred to as prioritized spectrum. The term "managed area," as used herein, refers to a geographical area in which the management system 10 exercises control over access to the prioritized spectrum by the secondary users 16. The managed area may be thought of as a geo-fenced area of defined geographic scope in which the management system 10 is configured to sense spectrum use and control use of prioritized spectrum by the secondary users 16.

An exemplary incumbent user 14 that has dominating rights in spectrum is a government user, such as an emergency responder, the military, or another party. For purposes of a descriptive example, aspects of the spectrum management system 10 will be described in the context of spectrum in which the military has dominating use rights but, in the absence of a military user, other spectrum users may use the spectrum. To further this example, an exemplary military user is a naval vessel that is sometimes present in a port and the port is the managed area 12. When not present in the port, other non-military users may use the spectrum. For practical reasons, the navy will not alert other users to the presence of the vessel. Therefore, the other users must have a mechanism by which to avoid use of the protected spectrum associated with the vessel and use alternative spectrum for wireless communications when the vessel is present and using the protected spectrum. It will be appreciated that the disclosed techniques for spectrum management may be used in other situations and locations, and the incumbent user 14 need not be a military or government user.

The spectrum management system 10 may include a sensor network 18 that includes one or more spectrum sensors 20. The spectrum sensors 20 may be, for example, spectrum sniffers or cognitive radios. The spectrum sensors 20 are deployed to sense spectrum use in the managed area 12. The managed area 12 includes a location where it is possible that the incumbent user 14 uses spectrum at some times and, at other times, does not use the spectrum. At times, the incumbent user 14 may move out of operative range from the sensor network 18 or simply not engage in protected spectrum use. For example, in the embodiment where the incumbent user 14 is a naval vessel, then the sensor network 18 may be deployed to sense spectrum at a port, the port being the managed area 12. At some times, the naval vessel may be in or near the port and using spectrum. At other times, the naval vessel may be present in the port, but not using spectrum. At still other times, the naval vessel may not be in or near the port. The port may be used by other types of spectrum users, such as one or more unprotected radios 16. Following the example of a port and naval vessel, exemplary unprotected users 16 may include radios used by commercial boaters, recreational boaters, and so forth. In addition, spectrum users in the form of unprotected radios 16 may be present on land near the waters of the port. An unprotected radio 16 is a radio that is prohibited from interfering with the spectrum use of an incumbent user 14.

The spectrum sensors 20 each may be configured to make the same types of spectrum scans on a regular (e.g., periodic) basis. In other embodiments, the sensors 20 may make continual scans of the spectrum environment. Alternative scanning approaches may be made. For example, each sensor 20 may be controlled to scan for a different attribute or RF signature. The attribute or RF signature that each sensor 20 is individually controlled to scan for may not necessarily indicate revealing information about the spectrum environment on its own, but may reveal valuable information about the spectrum environment when combined and analyzed with the scanning results from the other sensors 20. The use of multiple sensors 20 in this manner to compile information about the spectrum environment allows for the use of relatively simple and inexpensive sensors 20, while still allowing for the gathering of detailed spectrum data. As another example, one or more of the sensors 20 may be controlled based on the content of scanning results. The results may be used to schedule future scans and/or change the attributes or RF signatures for which the future scans are made. In this manner, if one or more of the sensors 20 make a certain type of detection, one or more of the sensors 20 may be tasked with making one or more additional scans to refine the scanning results or verify the scanning results.

Spectrum sensing data collected by the sensors 20 is forwarded to a central spectrum management server 22, which is also referred to as a database or spectrum allocation server. In some embodiments, the server 22 may be a white space allocation server that provides channel lists of available white space channels to unprotected white space radio devices. In other embodiments, the server regulates use of certain channels by unprotected devices. For instance, in the example where the protected channels are used by the military, the server may regulate use of those channels. The functions of the server 22 need not be limited to these functions.

In one embodiment where there are plural sensors 20, the server 22 may collect data directly from each sensor 20. In other embodiments, the data may be collected at a node in the sensor network 18 and collectively forwarded to the server 22. Also, the server 22 may perform processing of the sensor data or the processing may be performed in the sensor network 18. Processing of sensor data is described in more detail below. Based on results of the processing of sensor data, predetermined policies regarding spectrum use may be activated to control spectrum use by unprotected users 16. The server 22 may be responsible for activating the policies. In some embodiments, the server 22 may communicate with the sensor network 18 and/or the unprotected devices 16 over a communications medium 24, such as the Internet, a private network, or a cellular network. In one embodiment, the server 22 may manage spectrum use for multiple managed areas 12, each with its own sensor network 18. In other embodiments, the server 22 may be dedicated to managing the operations of one managed areas 12 and could be integrated with the sensor network 18.

Overall functionality of the unprotected user 16 may be controlled by a control circuit of the unprotected user 16 that may include a processing device. The control circuit may execute code stored in a non-transitory computer readable medium (e.g., memory) of the unprotected user 16 to carry out the operations of the electronic device 10. For instance, the control circuit may be used to execute an operating system and other applications that are installed on the unprotected user 16. The operating system or applications may include executable logic to implement the functions of the unprotected user 16 that are described herein. The unprotected user 16 may include any other appropriate components used to implement its operational and communications functions.

The server 22 may be implemented as a computer-based system that is capable of executing computer applications (e.g., software programs), including a spectrum management function 26 that, when executed, carries out functions of the server 22 that are described herein. The spectrum management function 26 and a database 28 may be stored on a non-transitory computer readable medium, such as a memory 30. The database 28 may be used to store various information sets used to carry out the functions described in this disclosure. For example, the server 22 may store or access data about known protected radio devices. The memory 30 may be a magnetic, optical or electronic storage device (e.g., hard disk, optical disk, flash memory, etc.), and may comprise several devices, including volatile and non-volatile memory components. Accordingly, the memory 30 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the server 22 may include one or more processors 32 used to execute instructions that carry out logic routines. The processor 32 and the memory 30 may be coupled using a local interface 34. The local interface 34 may be, for example, a data bus with accompanying control bus, a network, or other subsystem.

The server 22 may have various input/output (I/O) interfaces for operatively connecting to various peripherals as well as one or more communications interfaces 36. The communications interface 36 may include for example, a modem and/or a network interface card. The communications interface 36 may enable the server 22 to send and receive data signals, voice signals, video signals, and the like to and from other computing devices via an external network. In particular, the communications interface 36 may operatively connect the server 22 to the communications medium 24.

In one embodiment, the server 22 may be configured to host the below-described services for a plurality of incumbent users 14 and protected users 16. In some embodiments, the services may include spectrum management functions, such as providing spectrum allocations or channel lists to qualified radio devices upon registration so as to allow the radio devices to make use of spectrum for wireless communications. Also, while the providing of services may be fully automated, the server 22 may host an Internet-style website for the various corresponding parties to conduct initial enrollment with the server 22, conduct manual registration if needed, access various tools and reports supplied by the server 22, and so forth. For supplying the services, the server 22 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

C. SPECTRUM MANAGEMENT

Available, interference-free spectrum for supporting wireless communications is a scarce resource and the demand for wireless communications is increasing. The following techniques assist in using spectrum efficiently while minimizing interference between incumbent spectrum users and secondary spectrum users.

The disclosed approach to geo-location spectrum management allows for specific geo-location information gathered about an incumbent user 14 by the sensor network 18 to remain "hidden" and undisclosed outside the sensor network 18 and server 22. From a computing standpoint, the sensor network 18 and server 22 may operate in a secure environment. Thus, the identity, precise location, and spectrum use of the incumbent user 14 may remain "obfuscated." For instance, data collected by the sensors 20 and information known to the server 22 about spectrum use in the area of the sensor network 18 may be kept confidential by not disclosing the data and information to the public. This may facilitate a dual objective of 1) securing the nature of spectrum use by certain types of protected users (e.g., military users) from public disclosure, including the identity and location of the protected spectrum users 14; and 2) allowing unprotected users 16 to use the spectrum when not employed by the protected users 14. Continuing with the example of military users, the military users require protection from RF interference to maintain a pristine RF environment, but do not necessarily want to disclose exactly what, where, or when they are operating to obfuscate their operations to the greatest extent possible. The disclosed approach relies on a combination of imposing centrally managed spectrum use policies and spectrum sensing to address this and similar situations.

A geo-location database stored by the server 22 (e.g., as part of database 28) is initially populated with information to regulate spectrum use to protect incumbents in the managed area 12 that is monitored by the sensor network 18. Some of this information, such as policies that are based on detected spectrum use, may be made public. Other data and processing techniques need not be made public. Non-public data may include information regarding detected spectrum use within a range of frequencies of interest by incumbent users 14, such as spectrum use at military bases and other non-defense related uses of spectrum. The spectrum use need not be continuous. For example, in the above-mentioned case of a naval vessel, the naval vessel may not always be present in the port associated with the sensor network 18.

Populating the database may be similar to populating a TV white space database with the known location and transmission parameters (e.g., antenna height and broadcast power) of TV stations. But in a TV white space database, each channel occupied by a broadcaster is deemed unavailable at all times and cannot be used by unprotected users. Also, the location and transmission characteristics of TV transmitters are generally known. In the context of detecting intermittent use of one or more channels by one or more incumbent users 14, the database may include data about spectrum use characteristics that, if detected by the sensor network 18, would indicate presence of a protected user 14.

In one embodiment, the database may be populated with detection triggers. Each detection trigger is defined by one or more spectrum use variables that indicate presence of a protected user 14. Spectrum use variables include, but are not limited to, location, frequencies or channels, power or energy, duty cycle, and waveform type. An exemplary detection trigger is detection of energy on a channel in excess of a predetermined energy threshold. Another exemplary detection trigger is detection of a waveform or pulse pattern on a frequency in a range of frequencies. Other types of detection triggers are discussed below and still other detection triggers will be apparent to those having ordinary skill in the art. Thus, spectrum analysis performed by the server 22 or the sensor network 18 may include identifying spectrum user by an incumbent user 14 and classifying the sensed spectrum use to determine if one or more detection triggers are satisfied. Identification and classification analysis may include one or more of waveform analysis, energy analysis, frequency analysis, location, area of influence, etc. Exemplary classifications include RADAR, cellular (e.g., 3G or LTE), WiFi, or other protocol type.

Figure 3:
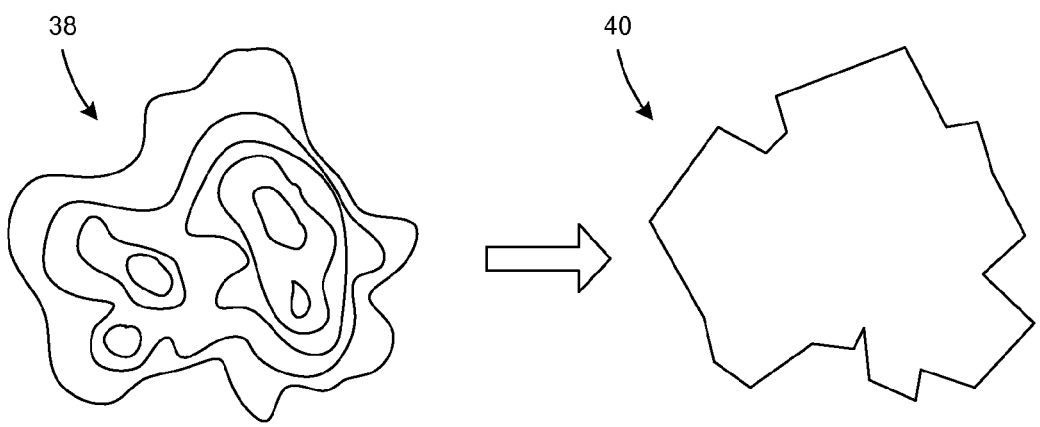
FIG. 3 is a diagram of spectrum sensor results that are mapped to a geometric representation thereof.

With additional reference to FIG. 3, the analysis of sensed spectrum may include mapping the sensed spectrum to a geometric representation of the sensed spectrum. For example, FIG. 3 shows a representation 38 of sensed spectrum data using contour bands of differing energy levels in which lower energy bands surround higher energy bands. The representation 38 is mapped to an empirically-derived geometric representation 40 of the geographic coverage of the spectrum used by the incumbent user 14. In one embodiment, the geometric representation 40 is in a format that may be analyzed with respect to geography. For example, the geometric representation 40 may be expressed in geographic information systems (GIS) format. The geometric representation 40 may be used to compare sensed spectrum use against location criteria specified in the detection triggers.

In one embodiment, a determination is made that an incumbent user 14 is present and using spectrum in a protected manner when sensor data indicates that the conditions in the detection trigger are present. As will be appreciated, the detection triggers may be configured to distinguish between spectrum use by an incumbent user 14 that is to be protected from interference by secondary spectrum users 16 and spectrum use by an incumbent user 14 that is not protected from interference by secondary spectrum users 16. Additionally, the detection triggers may be configured to distinguish between protectable spectrum use by an incumbent user 14 and spectrum use by a secondary user 16.

One or more policies are associated in the database with each detection trigger. When sensing data satisfies the conditions of a detection trigger corresponding to protected spectrum use of an incumbent user 14 so that the detection trigger is "set off" or "tripped," then the policy (or policies) associated with the detection trigger is activated. For this purpose, the database is further populated with policies.

Each policy defines a protection for the operation of incumbent radio devices 14. Each policy specifies protection parameters in the form of spectrum use restrictions on spectrum use by secondary spectrum users 16. The spectrum use restriction defined in a policy includes one or more of a geographic area (or exclusion area), spectrum parameters (e.g., frequency range or one or more channels), duration, transmit power limit, and any other information to effectively protect incumbent radio devices 14. Therefore, during the specified duration, application of the spectrum use policy will limit the ability of one or more secondary spectrum users 16 to use spectrum in the location defined by the exclusion area, to use spectrum defined by the specified frequency range or channels), and/or to use specified spectrum with greater than a specified transmit power. Thus, certain spectrum may be unavailable by application of the policy or certain spectrum may have certain use restrictions in terms location, transmit power, etc. If the secondary user 16 uses spectrum in a manner inconsistent with the applied policy, the secondary user 16 may be considered in violation of the spectrum use restriction of the spectrum use policy.

An exemplary policy may be to make spectrum used by the protected user 14 unavailable for use by unprotected radios 16. The geographic scope of the policy may be predetermined. The geographic scope, for example, may include the entire managed area 12 associated with the sensor network 18. In another embodiment, the geographic scope may be a predetermined area. The geographic scope may be determined by the number and/or location of sensors 20 that detected spectrum use contributing to "setting off" the detection trigger. For example, if one sensor 20 makes a detection that sets off the detection trigger, then the geographic scope may be a predetermined boundary surrounding that sensor 20. If more than one sensor 20 makes a detection that sets off the detection trigger, then the geographic scope may be a predetermined boundary that is larger than the boundary had just one sensor 20 set off the detection trigger.

The duration (or persistence) for the protection(s) defined by each policy is preferably as short as possible. This is to reasonably avoid "over-protecting" the incumbent user 14 and to minimize the information that is available about the incumbent user 14. In one embodiment, the duration is the same as or shorter than the intervals between spectrum sensing reports from the sensor(s) 20 to the server 22. For example, the duration may be a length of a time period between sequential spectrum scans made by the sensor network 18 plus a short time period to allow for processing of the sensor data and communicating with affected secondary users 16. In this case, the policy could be reset each time the sensor(s) 20 reports an observation that trips the same detection trigger.

The application of a policy that makes spectrum unavailable to unprotected users 16 may be communicated to affected unprotected users 16 in a number of manners. One exemplary technique is to transmit a revocation message to the unprotected users 16 from the server 22. In this technique, it is preferable that the server 22 has knowledge of the presence of unprotected users 16. So that the server 22 is aware of the presence of unprotected users 16, the unprotected users 16 may be required to register with the server 22 and/or acquire authorization to use spectrum in the managed area 12. In one embodiment, the registration process may include providing a set of spectrum access permissions to the unprotected user 16, such as by notifying the unprotected user 16 of available channels at the time of registration. If a policy is activated that changes the channel availability, the revocation message or a modified set of spectrum access permissions is sent to the affected devices.

In another exemplary technique, a beacon may be broadcast by the sensors 20. The beacon may indicate which channels unprotected users 16 may use. If a change occurs due to activation of a policy, then the beacon may change and/or include a command to vacate the affected channel(s).

The actual sensing data that sets off a detection trigger is not shared with any devices outside the sensor network 18 and server 22. This includes not disclosing the reason why one or more channels are not available to unprotected users 16. Hence, based on data gathered and provided by the sensing network 18, the server 22 will apply relevant policies that obfuscate sensitive incumbent user data and provide relevant protections to the RF environment.

In some spectrum bands, the concept of "levels of priority" may be defined and applied. For example, bands with priority levels are described in the President's Council of Advisors on Science and Technology (PCAST) report titled "Realizing the Full Potential of Government-Held Spectrum to Spur Economic Growth" dated Jul. 20, 2012. In this case, the sensor network 18 also may gather information indicative of the type of use detected by the sensors 20 and provide that data to the server 22. Exemplary types of use that are detectable include, but are not limited to, long term evolution (LTE) and radar. Using the PCAST example, spectrum use may be identified as "primary," "secondary," or "tertiary" and policies may be adapted for each category of use. In this case, the server applies the priority-guided policies to implement varying degrees of protection based on the type of users that are sensed to be present. This would, again, provide for obfuscation of incumbents since the protection(s) would be for a class of incumbents and not for a single incumbent. More specifically, no single incumbent is uniquely identified and the policy would, at the most, be indicative of the class of incumbent that invoked the class policy.

D. EXAMPLES

Examples in which the disclosed techniques are employed will be described.

D(1). Example 1

In example 1, a single sensor 20 is associated with a managed area 12. Also in this example, the sensor 20 determines if one or more detection triggers are set off. Alternatively, the server 22 makes this determination from data reported by the sensor 20. For example, a single RF sensor 20 (e.g., a cognitive radio) is placed at a strategic location within the managed area 12 (e.g., within a port) and scans for the presence of an incumbent user 14 (e.g., a naval vessel). When the sensor 20 identifies the presence of an incumbent user 14, the sensor 20 sends a message to the server 22. To maximize obfuscation of the nature of the incumbent user 14, the data provided from the sensor 20 to the server 22 may be minimal in nature. For instance, the message may indicate whether a particular frequency segment is active or is inactive. In this manner, the sensor 20 simply identifies spectrum used by the incumbent user 14 (e.g., frequency or channel on which the incumbent user 14 is detected). In a more involved example, the sensor 20 may distinguish between two or more types of spectrum used to resolve which of plural detection triggers are set off. In this case, the detection trigger that was set off may be supplied to the server 22 so that a corresponding policy may be implemented.

In other implementations, more detailed information may be provided from the sensor 20 to the server 22. For instance, the information provided by the sensor 20 could include one or more of location of the sensor 20 (if not already known to the server 22), frequencies or channels, energy (e.g., signal strength), duty cycle, waveform type, and azimuth (e.g., resolved through scanning and antenna technology). In this case, the server 22 may make a further determination as to which of several policies to implement by analyzing the provided data.

As an exemplary detection trigger applied by the sensor 20, the sensor 20 may detect presence of an incumbent user 14 by detecting a specific waveform (e.g., SC-FDMA or RADAR pulse) that exceeds a specified energy threshold in a specified frequency range. Another exemplary detection trigger may be the detection of a specific waveform (e.g., SC-FDMA or RADAR pulse) that exceeds a specified energy threshold in a specified frequency range and having another specified characteristic, such as a specified duty cycle.

The server 22, upon receipt of a message from the sensor 20 that a detection trigger is tripped, applies a location-based incumbent protection policy associated with the tripped detection trigger. The policy is configured to restrict access (by secondary users 16) to the affected spectrum within a restricted area for a predetermined (policy-based) period of time. The size and shape of the restricted area, the period of time, and the affected spectrum that the unprotected user 16 may not use are pre-defined in the policy associated with the tripped detection trigger. In one exemplary embodiment, the restricted area may be a circle defined by a point and a pre-determined radius. Alternatively, the restricted area could be a predefined region defined by a polygon or set of curves. In some situations, the policy may define a greater amount of spectrum than is actually used by the incumbent user 14. In this case, the policy may be modified so that spectrum defined by the policy and not used by the incumbent user 14 (e.g., channels available to the incumbent user 14, but not used by the incumbent user 14) is not subject to the applied restrictions and may be used by the unprotected radios 16. Thus, the policy may be modified to allow for the greatest use of spectrum. Some policies may be configured to not allow modification.

Figure 4:
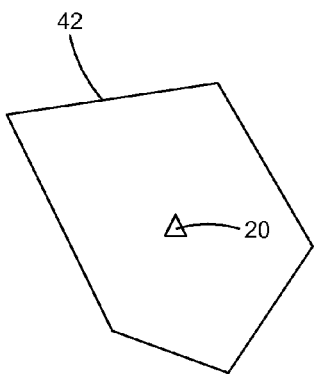
FIGS. 4 and 5 show exemplary shapes for policy-based restricted areas in which unprotected radios are restricted from using spectrum.
Figure 5:
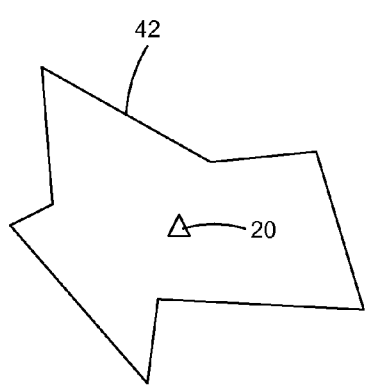

FIGS. 4 and 5 show exemplary shapes for restricted areas 42 for policies that are respectively applied based on different detections made by the sensor 20. FIG. 4 illustrates a restricted area 42 for a first policy that restricts use of a channel at a first frequency (frequency_1) and covers an irregular pentagon. The first policy may be applied when the sensor 20 detects a combination of spectrum use characteristics at frequency_1 with more than a first threshold energy level (energy_1) and in a first predetermined waveform (waveform_1). FIG. 5 illustrated a restricted area 42 for a second policy that restricts use of a channel at a second frequency (frequency_2) and covers another irregular shape. The second policy may be applied when the sensor 20 detects a combination of spectrum use characteristics at frequency_2 with more than a second threshold energy level (energy_2) and in a second predetermined waveform (waveform_2).

Figure 6:
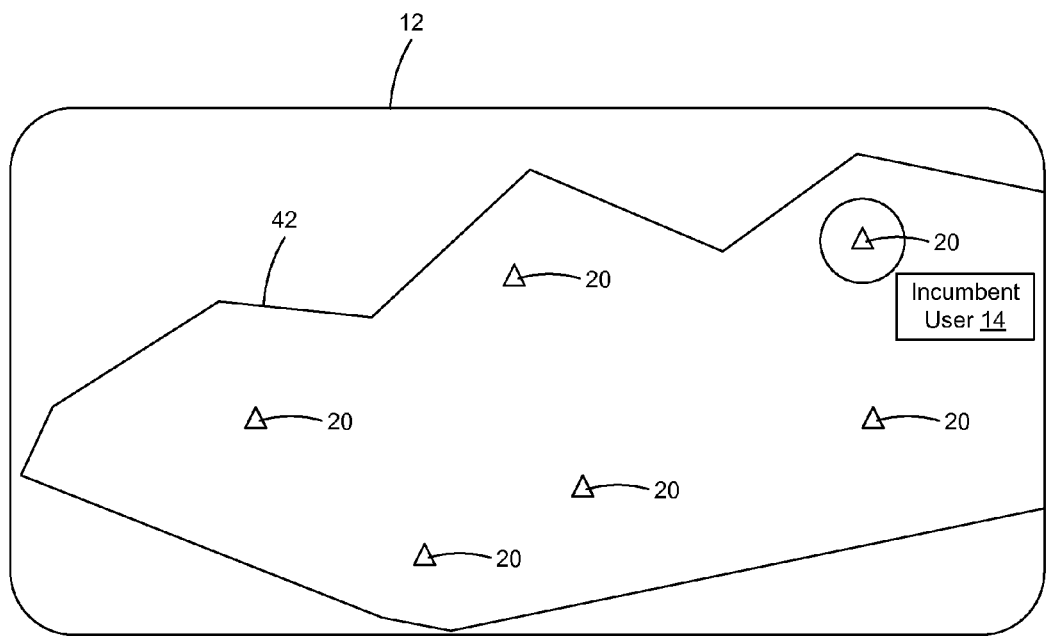
FIGS. 6 and 7 show exemplary managed areas in which spectrum use restrictions for unprotected radios are imposed.

With additional reference to FIG. 6, the strategies set forth in this example may be used with a sensor network 18 having multiple sensors 20. If any one of the sensors 20 detects spectrum use that sets off a detection trigger, then a policy associated with the detection trigger that was tripped will be applied. In the exemplary representation of FIG. 6, the circled sensor 20 senses spectrum use that trips a detection trigger. In this exemplary illustration, a policy is applied to restrict spectrum use by unprotected users in an area surrounding all of the sensors.

D(2). Example 2

In example 2, the sensor network 18 has multiple sensors 20. The sensors 20 are placed at various locations relative to the managed area 12 to sense spectrum use across the managed area 12. In this example, information from each sensor 20 is analyzed collectively. In one embodiment, the analysis is carried out to determine a contour of actual or potential spectrum use by the incumbent user 14. This contour is based on information including, but not limited to, location of the respective sensors 20, characteristics of the detections made the respective sensors 20, frequency or frequencies on which use is detected, detected waveforms, signal strength, etc. The analysis may be performed in a secure environment.

Following detection of spectrum use that trips a detection trigger, a policy is applied to provide protection for the incumbent user 14 in terms of time, frequency, location and area. Similar to above, this is done without revealing specific information about the incumbent user(s) 14 outside the sensor network 18 and/or the server 22.

In one embodiment, the policy is to aggregate individual policy areas associated with each sensor 20 that makes spectrum detections that trip the same detection trigger. From the viewpoint of each sensor 20 taken individually, this resembles the single sensor 20 embodiment described above, plus combining each of the resulting protected geographic areas to form a contiguous or non-contiguous protected area 42 for the incumbent user 14.

Figure 7:
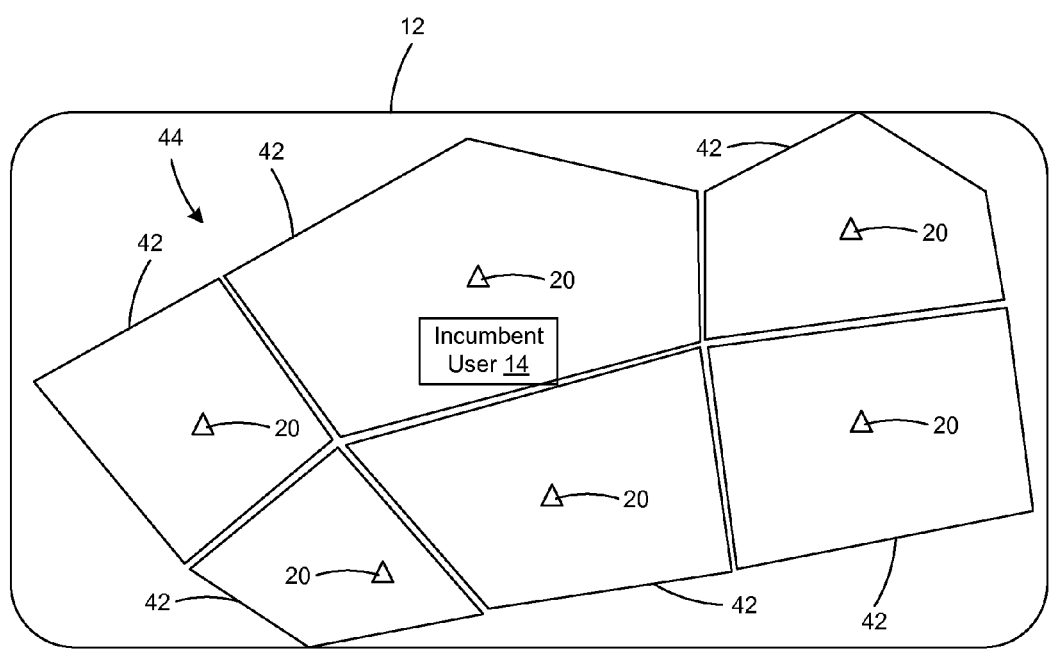

With additional reference to FIG. 7, illustrated are six sensors 20 that each detect spectrum use by an incumbent user 14. Each sensor 20 has a corresponding policy that is activated. Those policies aggregate to form an aggregated area 44 in which secondary users 16 are not permitted to use the spectrum (e.g., frequencies or channels) identified in the aggregated policies.

In another exemplary situation, some of the sensors 20 may detect spectrum use by the incumbent user 14 and other sensors 20 may not detect spectrum use by the incumbent user 14. In this situation, the area in which secondary users 16 are not permitted to use the spectrum identified in the activated policies (e.g., frequencies or channels) may be the aggregate of the restricted areas 42 of the policies for the sensors 20 that made the detection of the incumbent user 14.

In another example, if two or more sensors 20 detect spectrum use by an incumbent user 14, then a policy associated with the detected spectrum use may be activated. This policy may have a restricted area that geographically includes the sensors 20 that made the detection of the incumbent user 14.

E. CONCLUSION

Although certain embodiments have been shown and described, it is understood that equivalents and modifications falling within the scope of the appended claims will occur to others who are skilled in the art upon the reading and understanding of this specification.

What is claimed is:

1. A method of managing spectrum use in a managed area, comprising:
    sensing spectrum use with one or more spectrum sensors deployed in the managed area to sense spectrum use in the managed area, each sensor generating corresponding sensor data;
    determining that an incumbent spectrum user is actively using spectrum in the managed area by analyzing the sensor data from the one or more spectrum sensors to identify that one of plural incumbent user detection triggers is tripped, each detection trigger defined by one or more spectrum use variables that indicate presence of a corresponding incumbent user, and each detection trigger is associated with a spectrum use policy, and wherein spectrum use in the managed area by the incumbent user is carried out on an intermittent basis;
    identifying the spectrum use policy from the plurality of spectrum use policies that corresponds to the tripped detection trigger, each of the spectrum use policies relating to predetermined incumbent spectrum user protections, the identified spectrum use policy comprising a spectrum use prohibition by secondary spectrum users in a predetermined geographic area of the managed area for spectrum occupied by the incumbent user, the predetermined geographic area smaller than the managed area and protecting the incumbent user from interference by the secondary spectrum users; and
    creating a new or modifying an existing set of spectrum use permissions that allow use of spectrum defined in the set of spectrum use permissions by the secondary users without violation of the spectrum use prohibition of the spectrum use policy, and notifying one or more secondary spectrum users of the new or modified set of spectrum use permissions.

2. The method of claim 1, wherein the spectrum use variables include a combination of two or more of location, area of influence, frequencies or channels, power or energy threshold, duty cycle, pulse pattern, protocol type, and waveform type.

3. The method of claim 1, wherein the spectrum use prohibition further comprises spectrum parameters and a duration.

4. The method of claim 3, wherein the duration is defined by a length of a time period between sequential spectrum scans made with the one or more spectrum sensors.

5. The method of claim 1, wherein the notifying of the one or more secondary spectrum users is carried out by revoking at least part of a set of spectrum access permissions previously provided to the one or more secondary spectrum users.

6. The method of claim 1, wherein the notifying of the one or more secondary spectrum users is carried out by modifying a beacon broadcast by the one or more spectrum sensors.

7. The method of claim 1, wherein the sensor data and characteristics of the determined spectrum use are not communicated outside the one or more sensors and a server that identifies the spectrum use policy.

8. The method of claim 1, wherein prior to the new or modified spectrum use permissions, the one or more secondary spectrum users had permission to use spectrum covered by the spectrum use policy.

9. The method of claim 1, wherein the detection triggers are configured to distinguish between types of incumbent spectrum use.

10. The method of claim 1, wherein the detection triggers are configured to distinguish between incumbent spectrum use and secondary spectrum use.

11. A spectrum management system that manages spectrum use in a managed area, comprising:
    one or more spectrum sensors deployed in the managed area, the one or more spectrum sensors configured to sense spectrum use in the managed area, each sensor generating corresponding sensor data; and
    a spectrum management server configured to determine that an incumbent spectrum user is actively using spectrum in the managed area by analyzing the sensor data from the one or more spectrum sensors to identify that one of plural incumbent user detection triggers is tripped, each detection trigger defined by one or more spectrum use variables that indicate presence of a corresponding incumbent user, and each detection trigger is associated with a spectrum use policy, and wherein spectrum use in the managed area by the incumbent user is carried out on an intermittent basis; and wherein the spectrum management server is further configured to:
store a plurality of spectrum use policies,
identify the spectrum use policy from the plurality of spectrum use policies that corresponds to the tripped detection trigger, each of the spectrum use policies relating to predetermined incumbent spectrum user protections, the identified spectrum use policy comprising a spectrum use prohibition by secondary spectrum users in a predetermined geographic area of the managed area for spectrum occupied by the incumbent user, the predetermined geographic area smaller than the managed area and protecting the incumbent user from interference by the secondary spectrum users, and
notify one or more secondary spectrum users that spectrum defined in the identified policy is unavailable for use by the one or more secondary users.

12. The system of claim 11, wherein the spectrum use variables include a combination of two or more of location, area of influence, frequencies or channels, power or energy threshold, duty cycle, pulse pattern, protocol type, and waveform type.

13. The system of claim 11, wherein each policy further comprises spectrum parameters and a duration.

14. The system of claim 13, wherein the duration is defined by a length of a time period between sequential spectrum scans made with the one or more spectrum sensors.

15. The system of claim 11, wherein the one or more secondary spectrum users are notified by revoking at least part of a set of spectrum access permissions previously provided to the one or more spectrum users.

16. The system of claim 11, wherein the one or more secondary spectrum users are notified by modifying a beacon broadcast by the one or more spectrum sensors.

17. The system of claim 11, wherein the sensor data and characteristics of the determined spectrum use are not communicated outside the one or more sensors and the server that identifies the spectrum use policy.

18. The method of claim 1, wherein the predetermined geographic area surrounds one or more of the sensors that generated sensor data indicating presence of the incumbent user.

19. The system of claim 11, wherein the predetermined geographic area surrounds one or more of the sensors that generated sensor data indicating presence of the incumbent user.

20. The system of claim 11, wherein prior to the notifying the one or more secondary spectrum users, the one or more secondary spectrum users had permission to use spectrum covered by the spectrum use policy.

21. The system of claim 11, wherein the detection triggers are configured to distinguish between types of incumbent spectrum use.

22. The system of claim 11, wherein the detection triggers are configured to distinguish between incumbent spectrum use and secondary spectrum use.

* * * * *